June 23, 1959  T. C. NUTTALL ET AL  2,891,722
APPARATUS FOR SIZING OBJECTS
Filed Sept. 19, 1957  5 Sheets-Sheet 1

United States Patent Office 2,891,722
Patented June 23, 1959

2,891,722

APPARATUS FOR SIZING OBJECTS

Thomas Cayton Nuttall, Croydon, and Denis Edward Urry, Forest Hill, London, England, assignors to Rank Cintel Limited, a British company Application September 19, 1957, Serial No. 684,927

Claims priority, application Great Britain September 25, 1956

6 Claims. (Cl. 235—92)

In many industries and in research laboratories it is nowadays a frequent requirement to determine the size distribution, of pulverate or comminuted material. The size distribution of an object is determined by the number of particles contained in a random sample of the material which are found to be within each of a number of mutually exclusive size ranges. This requirement arises for example in the evaluation of ground or powdered substances, such as pigments, in the estimation of the degree of atmospheric pollution by examination of slides upon which contaminant solid particles present in the air have been deposited and in other applications too numerous to mention. Until recently such determinations have been made by visual, usually microscopic, examination of a random sample of the substance dispersed over a suitable area and estimation of the number of particles in each of a series of size ranges by the aid of a series of reticulate graticules. This method of determining the size distribution of a substance has been found to be laborious, time-consuming and inaccurate owing to the rapid onset of operator fatigue.

It is presently an increasing practice to effect determinations of the size distribution of divided substances by dispersing a random sample of the divided substance over a suitable field and scanning a field containing the particles, or an image of this field, by means of a scanning element which is most frequently but not essentially a light spot imaged from the screen of a cathode ray tube, so as to derive trains of signals in a device responsive to the action of the scanning element upon the scanned field. These signals contain information as to the number and sizes of the particles in the scanned field and may then be processed in a number of different ways to extract the required information as to the size distribution of the sample. A number of methods of signal processing for this purpose have been described, for example in a publication entitled "The Physics of Particle Size Analysis" being supplement No. 3 the British Journal of Applied Physics (London, 1954).

These prior methods of signal processing, however, have often been found to suffer from a number of disadvantages which render their use less desirable than would at first appear. Some of these disadvantages and the way in which they may be overcome by the use of the present invention are herein described. In describing processes and apparatus for determining the size ranges of divided substances by scanning an area containing a distributed sample of the substance, the size of an object is deemed to be defined by the longest continuous intercept made by the object upon any of the scanning lines. The requirement of counting only those objects exceeding a prescribed size is therefore transformed into the requirement of counting only those objects which yield one or more continuous intercepts longer than a prescribed value. If the scanning element moves along the lines with constant velocity, as is uniformly the practice, length and duration are equivalent, so that the problem of sizing becomes that of counting objects which yield at least one signal exceeding a predetermined duration.

It has previously been proposed to effect sizing by deducting from all the derived signals a constant amount equal to the intercept duration of a particle of the minimum size to be counted, so that signals from intercepts of less than this duration are completely eliminated. Objects larger than the size range thus eliminated will still, in general, give rise to intercepts in several successive lines. It has therefore been proposed in the specification of our United States patent application No. 507,370, now Patent No. 2,803,406, to arrange that only the first or last signal developed by any one object shall be effective in registering a count.

The method outlined above, whereby objects less than a predetermined size are prevented from being counted by subtracting a chosen duration from each derived signal, has been found in practice to be subject to certain difficulties. Except in those cases where the shape of an object is such that intercepts on successive scanning lines pass through a single maximum value it will be obivous that the above-described method of effectively reducing the size of the object is liable to cause a single original object to yield separate groups of intercepts apparently arising from more than one "reduced" object. Even with objects of wholly convex outline, when this effect should not occur, it is found that the unavoidable presence of fluctuation noise in the originally-derived signal produces the effect of jagged edges to the objects. When an object is of such form that it yields many intercepts close to the prescribed minimum value it is found that the presence of fluctuation noise may cause the "reduced" object to be effectively broken up into many parts and so to be counted as a plurality of objects. Since fluctuation noise can never be completely eliminated from the signal circuits this fault severely detracts from the usefulness of the above-described method.

It is an object of the present invention to provide improved apparatus for determining how many of a number of objects dispersed over a field exceed a predetermined size, in which the difficulties described above are eliminated or reduced.

It is a further object of the invention to provide sizing apparatus which will enable a count to be made of all those objects among a plurality of objects dispersed over a field which exceed a predetermined size and which will not be liable to error owing to the varying forms of said objects.

It is yet another object of the invention to provide sizing apparatus which may readily be adjusted to make determinations of the number of objects in a dispersion of said objects over a field which exceed any one of a plurality of predetermined sizes.

Sizing apparatus according to the invention therefore comprises scanner means for developing a scanning element and for effectively traversing it over a field containing a dispersion of objects of which the size distribution is to be determined in a predetermined pattern of scanning lines to develop initial electrical signals varying as said scanning element does or does not encounter any said object. Initial signals thus derived are then fed to means for developing from them quantized electrical signals having a first value when said scanning element encounters any said object and a second value at all other times. The invention also provides a signal circulating path including in the order recited, injection means for introducing signals into said path, gate means for preventing the passage of signals circulating in said path save when a control signal is applied to a control terminal of said gate means, means for terminally extending by a first predetermined amount the duration of signals circulating in said path to yield extended signals, a delay device having input and output terminals and arranged to delay signals applied thereto by an amount such that the mean signal circulation time in said path is equal to the effective line repetition period of said scanning pattern, means for applying said extended signals to said input terminal and means for returning signals from said output terminal to said injection means. The invention also provides counter means arranged when fed with signals differently delayed by an amount substantially equal to the circulation time of said path to record a count each time the number of signals circulating in said path changes in a predetermined sense. To this counter are applied signals from the input and output terminals of said delay device. The invention also provides means for applying said quantized signals firstly to clipper means by which the duration of said quantized signals is initially reduced by a second predetermined amount to yield clipped signals which are applied to said injection means and for applying said quantized signals secondly to said control terminal of said gate means. Said counter means then registers a count when and only when said scanning element encounters an object having a dimension in the direction of said scanning lines which is greater than that corresponding to the distance traversed by said scanning element in the time of said second predetermined amount.

A feature of the invention consists in providing means interposed between said quantizing means and said control terminal for delaying said quantized signals by a third predetermined amount less than said second predetermined amount prior to their application to said control terminal and means interposed between said clipper means and said injection means for terminally extending the duration of said clipped signals by a fourth predetermined amount less than said third predetermined amount prior to their application to said injection means.

The features of the invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 1:
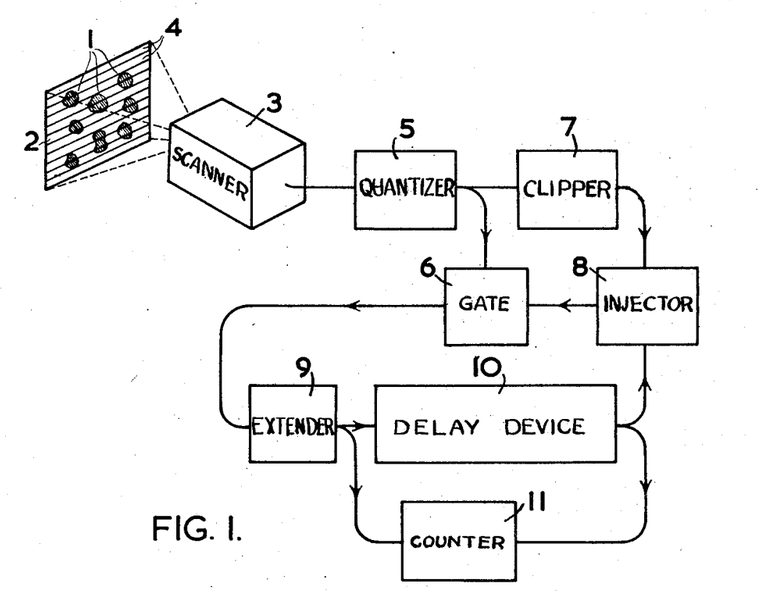
Figure 1 is a schematic diagram illustrating one embodiment of sizing apparatus for carrying out the present invention.

In Figure 1, objects 1 of which those exceeding a predetermined size are to be enumerated, are dispersed in a field 2 scanned by an appropriate scanner 3, which will for convenience be regarded as scanning the field in a succession of contiguous parallel lines 4. It is, of course, essential that the spacing of these lines is appropriately related to the size of objects 1, so that any object of a size which it is required to count shall intercept a number of lines. The pattern in which the area is scanned need not comprise a single array of parallel lines respectively parallel and perpendicular to the two directions of deflection at a high and a low repetition rate. For some applications it may be advantageous to employ a diagonal pattern of lines produced by deflecting the scanning element in perpendicular directions at repetition rates which differ but slightly. The former scanning pattern is more convenient for purposes of explanation, however.

The scanning device 3 may comprise a television camera including a pickup tube together with an appropriate optical system and sources for supplying appropriate operating voltages to the tube and deflecting and focusing currents to associated coil systems. Such a tube may include a photosensitive member, a target member upon which an electric image is produced corresponding with the illumination of the photosensitive member and means for producing an electron beam for scanning the target. Such a pickup tube generates within it an electron current which varies in accordance with the position of the scanning beam upon the scanned image. This current passes through an external load impedance to yield the output signals.

Alternatively, and for many purposes preferably scanner 3 may comprise a flying spot cathode ray tube, together with appropriate sources of operating voltage and deflection currents, the screen of the tube being imaged upon the scanned area light affected by which is caused to fall upon the photocathode of an electron multiplier photocell to generate a varying current which passes through a load impedance to yield the output signals.

However derived, the signals from scanner 3 pass to a quantizer 5 which yields an output signal having one value when the scanning beam falls upon an object (or upon an image of an object) and another value when it does not. This action is readily affected by employing as the quantizer 5 a bi-stable trigger circuit which changes from a first stable condition to a second when the input signal applied to its exceeds a first datum value and returns from the second to the first stable condition when the input signal falls below a second datum value slightly lower than the first datum. Many such circuits are known in the art and it is not considered necessary to describe any particular circuit in detail.

The output signal from quantizer 5 is applied firstly to a gate circuit 6, which may be any suitable known form of voltage-controlled signal gate, in such polarity that the gate is closed when the scanning beam is not incident upon an object, but opens to allow the passage of signals when the scanning element falls upon an object.

The quantized signals are also fed into a clipper device 7 which suppresses from the start of each a portion of a first predetermined duration, yielding an output signal corresponding to that portion only of an applied pulse which occurs more than a predetermined time after the commencement of the initiating pulse.

Shortened pulses from front clipper 7 are now injected into a pulse circulatory system comprising an injector 8, gate 6, and extender device 9 and a delay device 10, signals from the output of device 10 being applied to injector 8 for recirculation.

Injector 8 includes a circuit such that an output of predetermined magnitude is obtained when an input signal is received at either or both of two input terminals. Signals arising in injector 8 by reason of the application to it of either a shortened signal from clipper 7 or a delayed signal from delay device 10 are allowed to pass through gate 6 only if concurrent with a quantized signal. The signals which are allowed to pass through gate 6 are extended by extender 9, by a predetermined amount, that is, they are made to continue for a predetermined period, which for reasons explained below is conveniently made equal to two picture points, after their original termination. The extended signals are then applied to delay device 10, which is arranged to delay the signals by a time not quite equal to the duration of one line scanning period. Most conveniently the delay introduced by delay device 10, is made equal to one line scanning period less one picture point, so that the delayed signal passes through injector 8 and its leading edge arrives at gate 6 one picture point before the end of a line scanning period subsequent to the initiation of the original shortened signal while its lagging edge, owing to the extension introduced by device 9, arrives one picture point late. During the scanning of any object of a size to be counted which intercepts more than one scanning line gate 6 will be open when the leading edge of the extended signal reaches it and the pulse will be recirculated, becoming progressively broader about its original mean position.

Figure 2:
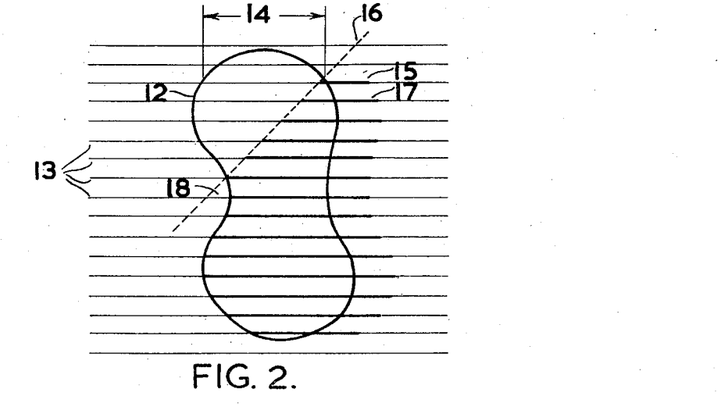
Figure 2 is a diagram explanatory of the operation of the apparatus shown in Figure 1.

This action is illustrated in Figure 2, in which the outline of an object being counted is represented by the heavy line 12. This object is considered as being traversed by a scanning element moving along each in turn of a succession of scanning lines represented by fine parallel lines, indicated generally by reference 13. The minimum size of object to be counted is that represented by dimension 14 as applied to the second of scanning lines 13 which encounters the object. This line is indicated specifically by reference 15. It will be seen that in line 15 object 12 is slightly greater than the minimum dimension and a shortened pulse is therefore emitted by clipper 7 and passed into the signal circulatory system via injector 8. Since gate 6 is opened by the presence of a quantized signal at the output of quantizer 5 the pulse passes on to extender 9 to yield a pulse which commences at a time later than the leading edge of the quantized signal by said second predetermined amount equivalent to minimum dimension 14 and continues after the trailing edge of the quantized signal for a time determined by the amount added to the pulse duration by extender 9. Conveniently the additional pulse duration amounts to two picture points. The pulse leaving extender 9 is represented by the thickening at 15 of line 19.

During the next line the circulating pulse arrives at injector 8 before the commencement of the shortened pulse derived during the scanning of that line and terminates after the shortened pulse finishes. The injector is arranged to provide an output whenever it receives either a quantized or a circulated pulse, so that it provides an output pulse 17 which commences one picture point earlier than the pulse in the preceding line, as indicated by the broken line 16, which has a slope of 45°.

This action is repeated during successive scanning lines until, as indicated at 18 the beginning of the recirculated pulse is gated out by the action of gate 6, since there is no quantized pulse to open the gate until the recirculated pulse has already been in existence for a period.

The output pulse from injector 9 will extend for two picture points longer than the shortened pulse from which it was derived. Part of this extension will be removed by the operation of the gate 6 which closes as the quantized pulse ends when the scanning spot leaves the object. This pulse is again extended by two picture points by the operation of extender 9 to yield a pulse, illustrated by bold line 17, which commences one picture point before the pulse derived in the preceding line and terminates two picture points after the scanning spot leaves the object and ends the quantized pulse. During the scanning of the rest of the object each circulating pulse will have the same duration as the intercept of the object in the currently scanned line plus two picture points.

There is thus produced at the terminals of a counter device 11 which should include means for delaying the output from delay device 10 by a further one picture point period, a succession of signals which is continuous during the scanning of the object and will result in a single count only being recorded. The operation of apparatus according to the invention is thus distinguished from that of known apparatus in which a constant amount is clipped from each quantized signal and the resultant signals applied directly to a counter. If such a procedure were followed in the case illustrated in Figure 2, two separate successions of pulses would be generated, separated by an interval corresponding to the "waist" of the object, which has intercepts less than the minimum size to be counted, with the result that two counts would be recorded.

The operation of apparatus according to the embodiments of the invention illustrated schematically in Figure 1 will now be further described with reference to Figure 3.

*Description of circuit*

Signals from the scanning device employed are received at terminal 51 and applied to a potentiometer 52, from which an appropriate fraction of the input signals is applied to the input grid of a trigger circuit comprising a double triode 53, 54. The two halves of this valve are connected in known manner to form a Schmidt trigger circuit which will pass from one to the other of its stable conditions when the input signal exceeds a predetermined level, adjusted by means of potentiometer 52 and will return to its initial condition if the input signal falls substantially below the level at which the original transition occurred. The difference in the two triggering levels is known as the overlap and may be adjusted as necessary by varying the value of anode resistor 55 of valve 53.

Quantized signals appearing across the anode resistor 56 of valve 54 are fed directly by way of lead 57 to one input of a signal clipping circuit, which will be described below, and are taken by way of capacitor 58 to the grid of valve 59 which serves to invert the polarity of the signals. The polarity-inverted signals appearing across the anode resistor 60 of valve 59 are applied by way of a lead 61 to control a gate circuit, described in detail below, which is included in the signal circulatory system. Signals arising across resistor 60 are also taken by way of a lead 62 to control the operation of a pulse generator circuit comprising a trigger circuit including a double triode valve 65, 66 connected in a Schmidt circuit having a substantial degree of overlap.

The signals are differentiated by capacitor 63 and resistor 64 and are applied to the grid of valve 65 to cause the valve, which passes current when the circuit is quiescent, to be cut off with the result that the valve 66 passes current. This condition will persist until a positive voltage in excess of the designed overlap is applied to the grid of valve 65. A negative-going signal thus arises across the anode resistor 67 of valve 66. This signal forms the output pulse from the pulse generator and is taken by way of a lead 68 to the signal-shortening circuit to which reference has already been made. These signals are also differentiated by capacitor 69 and resistor 70 and applied to the grid of a valve 71, which is normally conducting but is cut off by the negative-going transient resulting from the commencement of the signal.

While valve 71 is conducting its anode is held at a predetermined potential by the action of a diode 72 which has its cathode connected to the anode of valve 71 and its anode connected to a stable source of potential represented for simplicity as a battery 73. The anode potential of diode 72 is arranged to be varied by means of a suitable control, in the present circuit by means of switch 74 which connects it to points of differing potential on the battery 73. This variation in potential provides a control of the minimum size of particle which the circuit will count, as will be more fully described below.

When valve 71 is cut off by the negative-going transient, a capacitor 75, which is connected between the anode of valve 71 and earth, commences to charge by way of a resistor 76 and a diode 77 which are connected in series between the anode of valve 71 and the h.t. line.

This charging action is linearized by the operation of a bootstrap circuit including valve 78 which has its grid connected to the anode of valve 71 so that there arises across its cathode load resistor 79 a signal exactly representing the rise in potential across capacitor 75. This signal is fed through an isolating capacitor 80 to the cathode of diode 77 so that the potential across resistor 76 remains substantially constant during the charging period.

The potential across capacitor 75 is also applied by way of resistor 64 to the grid of valve 65, which is thus made increasingly positive at a constant rate. After a time determined by the initial potential across capacitor 75, which in turn is controlled by the potential applied to the anode of diode 72 from source 73, the grid of valve 65 will reach the overlap potential and the valve will again conduct, thus cutting off valve 66 and terminating the output pulse. The positive-going transient then produced at the grid of valve 71 will cause that valve to conduct and to discharge capacitor 75 until the potential across it is again that determined by source 73. This action occurs very rapidly so that the pulse generator is almost immediately ready to perform a new cycle of operations.

If at any time during the generation of the output pulse the grid of valve 65 is driven positive by a signal resulting from the termination of the quantized signal the valve will immediately conduct and terminate the output pulse. As before, the circuit is immediately re-set ready to generate another pulse.

The quantized signals taken from the anode of valve 54 by way of lead 57 and the output pulses from the pulse generator by way of lead 68 are now mixed in a circuit comprising two double triodes 81, 82 and 83, 84. Each double triode is connected as a Schmidt trigger circuit, valves 82 and 84 being normally conductive and valves 81 and 83 cut off. When a signal at terminal 51 triggers the circuit comprising valves 53, 54, a positive-going pulse is applied to the grid of valve 81 to cause it to pass current, thus cutting off valve 82. At the same time the negative-going pulse generated by 65, 66 is applied to valve 84, which is therefore cut off while valve 83 passes current.

Valves 82, 83 share a common anode load resistor 85 and their conditions of operation are so adjusted that they pass equal currents when operative. Thus at the commencement of an "object" signal, although both triggers 81, 82 and 83, 84 are operated there is no change in potential across resistor 85. If the "object" has a duration less than that of the pulse generated by trigger 65, 66, the pulse is artificially terminated coincidently with the end of the object signal, as described above. In this case both triggers 81, 82 and 83, 84 return simultaneously to their initial condition and once again there is no change in potential across resistor 85. If, however, the object signal has a duration greater than that of the pulse generated by trigger 65, 66, then when this pulse ends trigger 83, 84 will be returned to its quiescent condition with valve 84 conductive while trigger 81, 82 is still in its operated condition with valve 81 conductive and valve 82 cut off. Under these conditions a positive-going pulse will arise across resistor 85 and will be terminated only at the end of the initiating object signal. Signals thus appear across resistor 85 only when an object encountered by the scanner gives rise to a signal greater than the minimum duration set by the length of the pulses generated by trigger 65, 66, and these signals have individual durations determined by the excess of the originating signals over the predetermined minimum.

The production of such signals and their application to a counter to obtain a record of those objects in an area which exceed a predetermined minimum is not new and although essential to the operation of the present invention does not form part of it, since such a comparatively simple system suffers from the defects referred to earlier in this specification.

In accordance with the present invention the shortened object signals which appear across resistor 85 are injected into a gated signal circulating path having a mean circulation time equal to one line period of the scanning process by which the object signals are derived. The signals are injected into the circulating path by means of an injector circuit comprising a cathode-coupled double triode 86, 87, the halves of which are so biased that valve 87 normally passes current while valve 86 is cut off. When a signal from resistor 85 is applied to the grid of valve 86 the valve is caused to pass currents which, flowing through the common cathode resistor 88 causes valve 87 to be cut off. There thus arises across the anode resistor 89 of valve 87 a positive-going signal which corresponds in duration to that arising across resistor 85. Positive-going signals will also appear at the anode of valve 87 as the result of negative signals from the signal circulating path which are applied to the grid of the valve as described below. Whatever their provenance, these signals are applied to a further gate circuit formed by another cathode-coupled double triode 90, 91, of which valve 90 is normally cut off and valve 91 passes current.

The amplitude of the pulse signal arising at the anode of valve 87 and applied to the grid of valve 90 is arranged to be insufficient to cause the valve to pass current unless its cathode potential is simultaneously lowered by the application of a negative-going signal to grid of valve 91. This negative-going signal is provided by the polarity-inverted quantized signal fed to the gate circuit by way of lead 61 as already described. Thus a shortened object signal injected into the circulatory system at injector 87 will be passed on by gate 90, 91.

The negative-going output signals from the anode of valve 90 in gate 90, 91 are applied to the input of a re-shaping trigger circuit comprising a Schmidt connected double triode 92, 93 which yields rectangular pulses of opposite polarity at the anodes of the valves.

The negative-going signal from the anode of valve 93 is fed via a rectifier 95 to the grid of a valve 96, which with the other half 97 of a double triode is connected in an Eccles-Jordan bistable circuit having appropriately poled rectifiers 98, 99 included in the cross-coupling circuits. Valve 96 will be cut off by the signal from trigger 92, 93 while valve 97 will commence to pass current, thus generating at the anode of valve 96 a positive-going signal. This signal persists until the bi-stable circuit 96, 97 is returned to its initial condition with valve 96 conducting. Owing to the presence of the rectifier 95, this action does not take place when trigger 92, 93 reverse on the termination of the pulse from gate 90, 91. The positive-going transient resulting from the differentiation of the signal at the anode of valve 93 by capacitor 100 and potentiometer 101 initiates the operation of a delay multivibrator formed by a double triode 102, 103. The positive-going signal received at the grid of valve 103 causes this valve to pass current and valve 102 to be cut off owing to the negative-going signal passed to its grid by way of capacitor 104. It is arranged that after an interval equal to two picture points the potential of the grid of valve 102 again rises above that of valve 103 by current flowing into capacitor 104 through resistor 105. The negative-going signal which then arises at the anode of valve 102 passes through a suitably poled rectifier 106 which prevents the previous positive excursion from passing, thus restoring the bi-stable circuit 96, 97 to its original condition and terminating the positive-going output pulse at the anode of valve 96. This output pulse will therefore have a duration equal to that of the input pulse plus two picture points.

The positive-going signal from valve 96 is fed via terminal 94 which supplies an undelayed input to a system for counting only the first or last signal of a sequence of signals occurring at intervals of one scanning line. Such a system is described in our co-pending United States patent application No. 507,370 to which reference should be made for a full description of its operation. For the purposes of the present invention it is sufficient to observe that the counting system requires to be fed with signals delayed by one line interval of the scanning process and will from such signals register a count only at the commencement or termination of the sequence of pulses resulting from the scanning of any one object.

The extended signals from valve 96 are also fed into a delay device 107, the nature of which must be chosen in relation to the parameters of the scanning process. The delay required is one line period less one picture point. In many cases a magnetostrictive delay system may conveniently be used for this purpose. Such a system conveniently comprises a suitable length of nickel-iron wire in which supersonic waves corresponding to the signals to be delayed are launched by means of a piezo-electric transducer. Signals corresponding to the supersonic waves are recovered from the strip by a second, similar transducer mounted on the strip at an appropriate distance from the first.

An alternative delay device which is found suitable in many applications comprises a rotating drum carrying a ferromagnetic track in which signals are recorded by inducing a change in magnetization and from which they are recovered by a device responsive to the recorded changes. The technique involved is similar to that of recording signals in magnetic tape and need not be further described.

Whatever the nature of delay device 107, it is so adjusted that the leading edge of a signal applied to it is reproduced after a delay equal to one line period less one picture point. The delayed signals are fed firstly to an output terminal 108 from which they are applied through an additional one picture point delay to the counting device described above, together with the undelayed signals from terminal 94.

The delayed signals are also fed to the grid of a polarity-inverter 109, which develops across its anode load resistor negative-going signals which are fed for recirculation to the grid of valve 87 by way of lead 110. Any negative-going signal applied to the grid of valve 87 gives rise to a positive-going signal at its anode which is applied to gate circuit 90, 91.

*Operation*

In the operation of the circuit, the signal circulatory system comprising gates 86, 87 and 90, 91, pulse extender 96, 97, delay device 107 and polarity inverter 109 will initially be quiescent. When the first object signal is received at terminal 51 it is quantized by trigger 53, 54 to yield a positive-going signal which is shortened in double trigger 81—84 by the duration of the pulse from trigger 65, 66. This pulse has a duration corresponding to the maximum particle size which is not to be counted and it will be seen that quantized signals of less duration do not yield any output from the double trigger. The first signal from a particle which has a duration greater than the predetermined minimum will feed a signal into the circulatory system at gate 86, 87: since there is necessarily a quantized signal present at the grid of valve 91, gate 90, 91 will pass the shortened signal injected at gate 86, 87 into the pulse extender circuit comprising trigger 92, 93 and bi-stable circuit 96, 97, which yields an output pulse having a duration equal to that of the shortened quantized signal plus two picture points.

The extended signal is delayed for a time equal to one line period less one picture point in device 107 and is then fed back via polarity inverter 109 to the grid of valve 87 and from the anode of that valve to the grid of valve 90. This signal will yield a signal at the anode of valve 91 only if a quantized signal is simultaneously present at the grid of valve 91, that is if the object has been encountered also in the next scanning line.

The output signals from bi-stable circuit 96, 97 and from delay device 107 are taken to terminals 94, 108 to provide a sequence of signals recurrent every scanning line whenever an object of at least the minimum size to be recorded is encountered by the scanner. These signals are fed to a counter device which records a count either whenever such a sequence first commences or when it terminates.

Throughout the description in relation to Figures 1 and 2 it was assumed that each time a pulse is circulated it is symmetrically extended by the addition of one picture point at each end of the original pulse. If this is done the original pulse will expand so that if the recirculated pulses are displaced on an oscilloscope subjected to the same scanning pattern as that used by the scanner the ends of the pulses will lie on lines at 45° to the direction of line scanning. If the outline of the object is encountered the pulses will be terminated.

Although such an arrangement "fills up" the outline of the object with marker pulses quite rapidly there exists certain circumstances under which errors may still arise. If for example an object is encountered which has a trailing edge sloping at 45° so as to be encountered by the scanning spot earlier in each line, then any noise in the signal being quantized may lead to the object being counted more than once. This difficulty may be reduced by extending the recirculated pulses by more than one picture element at either end at each circulation, for example, the delay introduced by device 10 may be made equal to one line period less two picture points and the extension of the pulse by device 9 made equal to four picture points. The limit to the advantage which may be gained by this means is set by the risk of a pulse being so extended between one line and the next as to enter gate 6 after the latter has been opened by a succeeding object. The optimum pulse length for a particular class of objects is readily determined by experiment.

The main purpose of the delay and broadening of the signals in the signal circulatory path is to make the circulating system expand to and then follow the boundaries of any object encountered which is of a size to be counted, which minimizes the chances of an object of unfavourable outline recording two or more counts. A considerable degree of protection from the deleterious effects of circuit noise is also obtained, but to obtain maximum protection from noise some further modifications of apparatus according to the invention are possible, as will now be described in relation to Figures 4 and 5.

Figure 4:
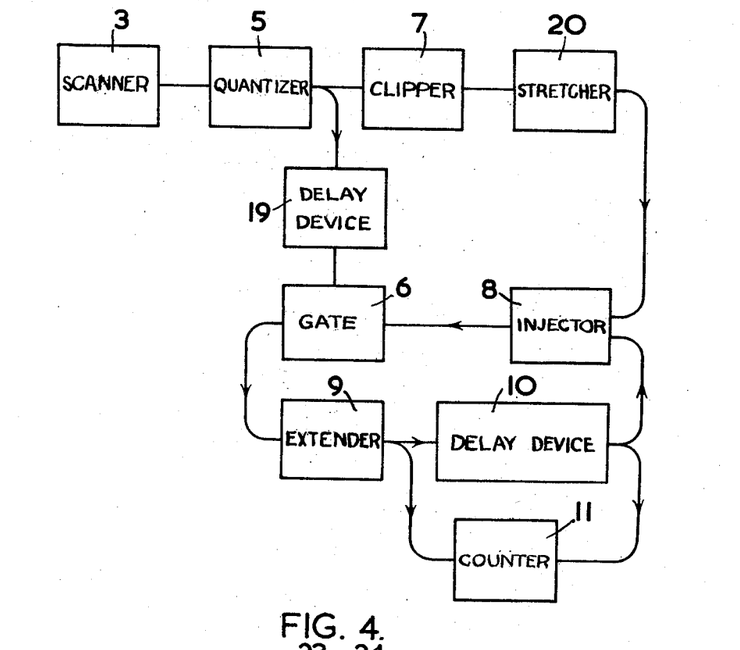
Figure 4 is a schematic diagram illustrating an alternative embodiment of apparatus for carrying out the present invention.

In the arrangement shown in Figure 4 additional means are introduced to shift the closing of the gate 6 clear of the trailing edge of the circulating signal and so to allow the use of additional broadening of the signal. The additional delay is introduced by means of an appropriate device 19 introduced between quantizer 5 and gate 6 while the additional broadening is effected by a device 20, subsequent to the device 7 which subtracts the sizing pulse from the leading part of the quantized signal.

Device 20 adds a predetermined amount to the end of the shortened pulse. The maximum noise immunity will be conferred by the maximum permissible broadening of the initially shortened pulse, but the broadening must not be such as to cause the signals originating in one object to mask or interfere with the sizing of other objects in the field. If it is arranged that the amount of broadening by device 20 is less than the additional delay introduced into the gate operation by device 19, which in turn is less than the duration of the sizing pulse which is used to shorten each of the quantized signals, the derived signal will still fall within the limits of the (delayed) boundary of the object and no harm will be done.

Figure 5:
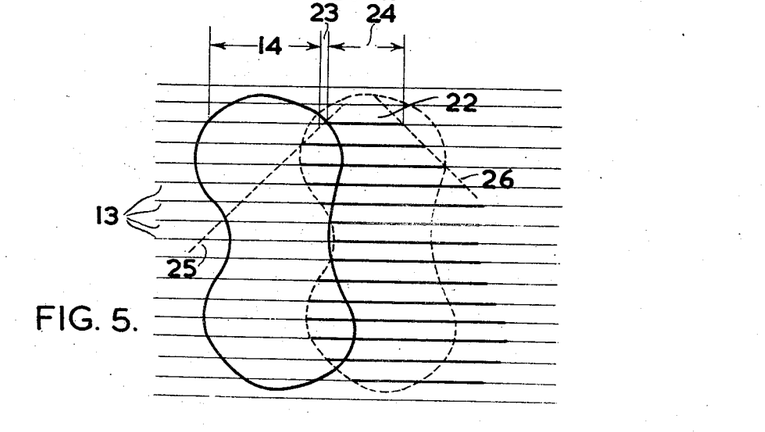
Figure 5 is a diagram explanatory of the operation of the apparatus shown in Figure 4.

The operation of the system is illustrated by Figure 5 which in general corresponds to Figure 2. It will be seen that the effect of the additional delay is to shift the effective position of the whole object, the pulse formed by the initial shortening and subsequent broadening commence with a pulse 22 the duration of which corresponds to the remainder 23 of the first shortened pulse plus the initial broadening 24 introduced by device 20. Each successive pulse is then symmetrically lengthened at the leading edge by reason of the delay introduced by device 10 being less than a complete line period, as already described and at the trailing edge by the broadening added at each circulation by device 9. The pulse thus expands as indicated by broken line 25, 26 until it fills an outline corresponding to that of the original object and extends beyond it at the trailing edge, as before.

It will be observed that the apparatus of Figure 4 differs from that of Figure 1 only in the inclusion of a delay device 19 in the lead between quantizer 5 and gate 6. Thus the apparatus of Figure 4 is as described in relation to Figure 3 with the addition of a suitable delay device connected in lead 61, which conducts control signals from valve 59 to control gate valve 91.

Figure 6:
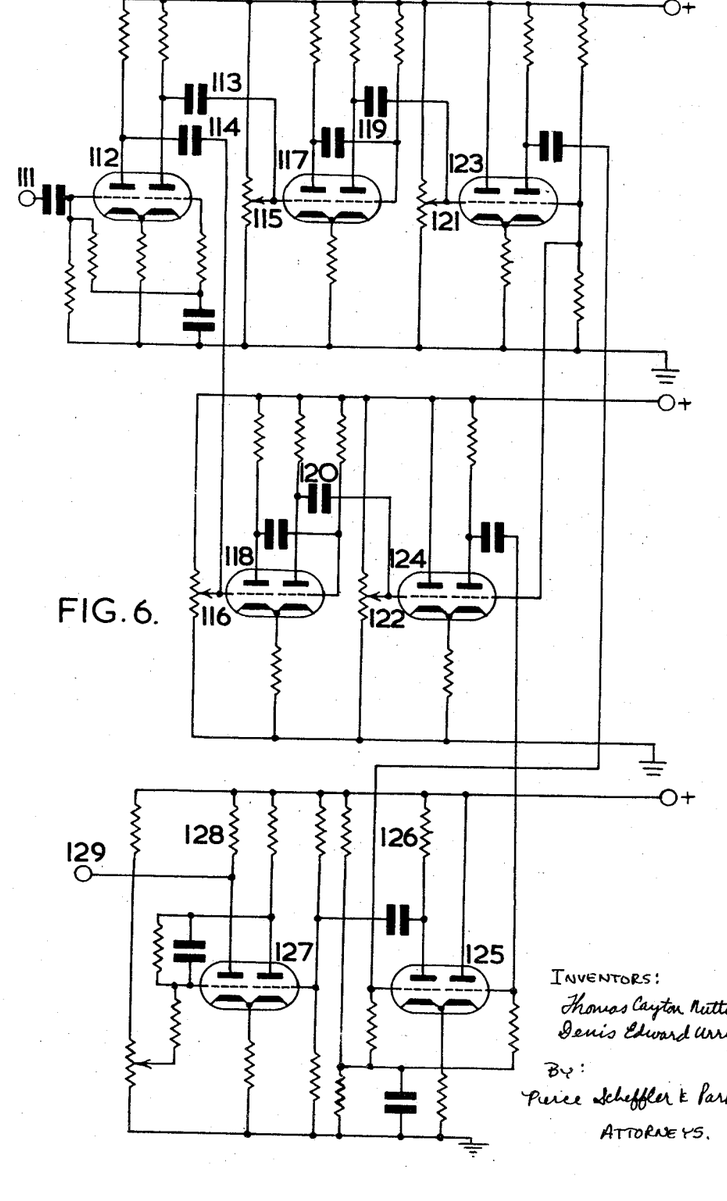
Figure 6 is a circuit diagram illustrating apparatus suitable for performing the function of delaying pulse signals required of device 19 of Figure 4.

A delay device suitable for use in this position in the circuit is illustrated by Figure 6. In Figure 6 pulse signals to be delayed are received at terminal 111 and are applied to double triode 112, operating as a cathode-coupled phase-splitter and providing at its two anodes identical signals of opposite polarity. These signals are applied through differentiating circuits consisting of capacitors 113, 114 and potentiometers 115, 116 to the grids of double-triode valves 117, 118, each of which forms a monostable multivibrator and is arranged to respond only to positive-going signals. Since the positive-going leading edge of each applied pulse gives rise to a positive-going spike at the grid of valve 117, but a negative-going spike at the grid of valve 118, only valve 117 will be triggered by this leading edge to produce an output pulse. Conversely, the trailing edge of an applied signal will trigger only valve 118.

Valves 117 and 118 are connected to form identical monostable multivibrators, yielding pulses of the same duration $t$ equal to the desired delay period. The output signals from multivibrators 117 and 118 are differentiated by the subsequent intervalve coupling circuits comprising capacitors 119, 120 and potentiometers 121, 122 and the resultant positive- and negative-going spike signals are applied to the input grids of two cathode-coupled amplifiers comprising respectively double triodes 123 and 124.

In each of these amplifiers the D.C. conditions are so adjusted that the input valve normally passes current while the output valve is cut off. Thus the positive-going spike resulting from the differentiation of the leading edge of a pulse has no effect on an amplifier, while the negative-going spike resulting from the trailing edge of a pulse causes the amplifier to yield a negative-going output signal.

The output signal from amplifier 123 is applied to the grid of one half of a double-triode adding amplifier 125 and the output signal from amplifier 124 to the other grid of adder 125, so that there arises across the load resistor 126 of this valve a train of alternate positive- and negative-going spikes. This pulse train is applied to control a trigger circuit comprising double-triode 127, which is arranged to have a substantial overlap, balanced about the mean potential of the applied signal train. The trigger 127 is thus set to one condition by the positive-going spikes in the applied signal train and to the other condition by the negative-going spikes.

The output signal thus developed across load resistor 128 consists of a train of pulses identical in duration with the input pulses but delayed in respect to these by a common time-interval $t$. These signals are fed out for use by way of terminal 129.

It is possible to vary the arrangement shown in Figure 4 by omitting the delay device 19 in the operating circuit for gate 6 and instead moving this gate from the position illustrated to a position between delay device 10 and injector 8. The delay introduced by device 10 is then appropriately reduced and a further delay unit placed between gates 6 and 8 to restore the total delay round the circulatory system to its correct value. Since the counting system requires to be fed with signals spaced by one line period an appropriate additional delay must then be introduced into the lead from delay device 10 to the counter 11.

It will be observed that the operation of apparatus according to the present invention involves firstly the detection of an intercept exceeding a prescribed value, and then the generation of a "marking signal" which continues at corresponding parts of each line in which the object is encountered. This marking signal is then treated in any suitable apparatus which will yield only a single count when a succession of pulses arises at corresponding points in consecutive scanning lines, preferably that described in the specification of our United States Patent No. 2,803,406.

Figure 3:
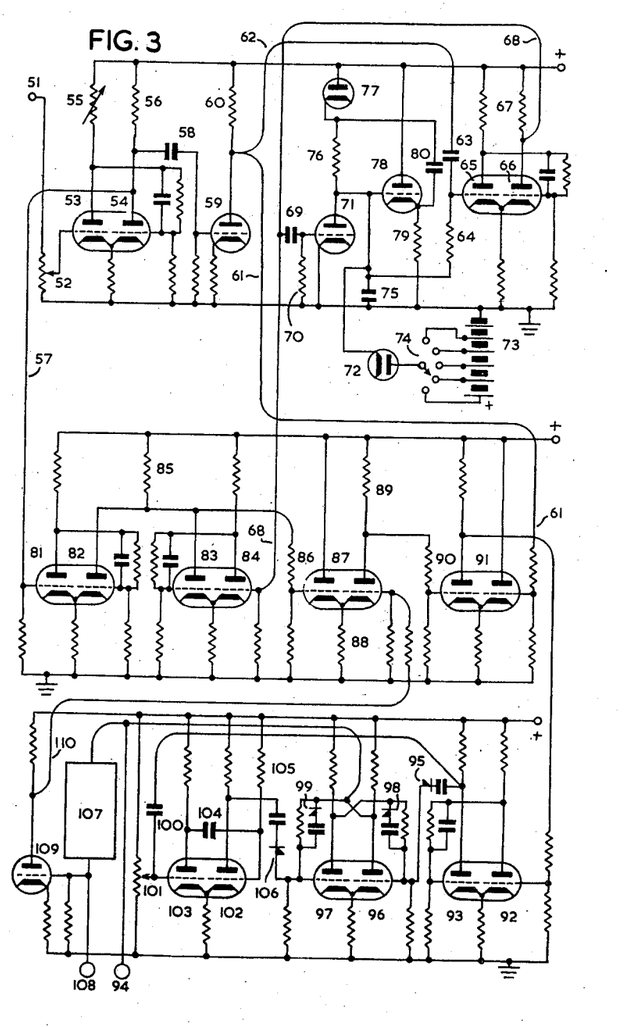
Figure 3 is a basic circuit diagram of a practical embodiment of apparatus of the kind illustrated schematically in Figure 1.
Figure 7:
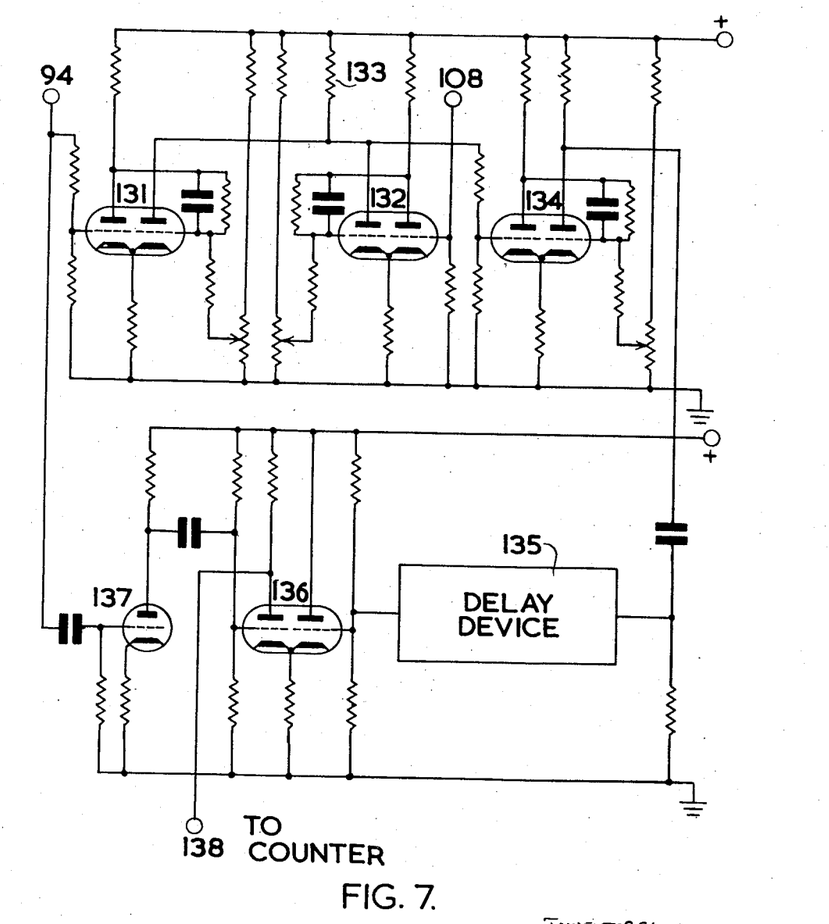
Figure 7 is a circuit diagram illustrating a circuit arrangement for developing one count pulse only from each object encountered.

The counter 11 of Figures 1 and 4, that is, the device to which the signals arising at terminals 94 and 108 of Figure 3 are applied, may conveniently be carried into practice by the circuit arrangement illustrated in Figure 7. In this drawing the input terminals numbered 94 and 108 are those to which in operation the undelayed signals from extender 9 and the delayed signals from delay device 10 are respectively applied. These signals are assumed to be positive-going, as in the circuit arrangement of Figure 3.

The signals received at terminals 94 and 108 are applied to the input grids of cathode-coupled trigger circuits comprising double triodes 131, 132 respectively. These trigger circuits share an output load resistor 133, across which there thus arises a signal train which is the sum of the delayed and undelayed signals. This signal train is applied to a trigger circuit comprising double-triode 134, which is arranged to have an overlap such that it changes from one to the other of its conditions only when both the signals received at terminals 94 and 108 have changed from one to the other condition. Thus this trigger circuit will develop an output signal, in which each pulse commences when a pulse becomes present in the delayed signal applied to terminal 108 as well as in the undelayed signal applied to terminal 44 and ceases only when both input pulses have ceased.

The output pulse from trigger 134 is applied to a delay device 135, having a delay of some one or two picture points. This delay device may conveniently be of the kind already described with reference to Figure 6.

The delayed output signal from delay device 135 is applied to control the operation of a gate circuit comprising double triode 136, so that only in the absence of a signal from delay device 135 can signals received at terminal 94 and inverted by triode 137 pass through gate 136 to appear at output terminal 138. Signals appearing at terminal 138 are passed to a conventional counter circuit registering a single count for every applied pulse.

The function of the apparatus above described with reference to Figures 8 and 9 is described in the specification of our United States Patent No. 2,803,406, to which reference should be made for a more exhaustive discussion of the principles and operation of the apparatus. Briefly, its effect is to yield a pulse at output terminal 138 only when scanner 1 encounters an object for the first time, as is required for the purposes of the invention.

We claim:

1. Sizing apparatus for enumerating those objects among a plurality of objects dispersed over a field which exceed a predetermined dimension, said apparatus comprising: scanner means for developing a scanning element and for effectively traversing said element over said field in a predetermined pattern of scanning lines to develop initial electrical signals varying as said scanning element does or does not encounter any said object, means fed with said initial signals for developing quantized electrical signals having a first value when said scanning element encounters any said object and a second value at all other times, a signal circulating path including in the order recited, injector means for introducing signals into said path, gate means for preventing the passage of signals circulating in said path save when a control signal is applied to a control terminal of said gate means, means for terminally extending the duration of signals circulating in said path by a first predetermined amount to yield extended signals, a delay device having input and output terminals and arranged to delay signals applied thereto by an amount such that the mean signal circulation time in said path is equal to the effective line repetition period of said pattern, means for applying said extended signals to said input terminal and means for returning signals from said output terminal to said injector means, counter means arranged when fed with signals differently delayed by an amount substantially equal to the circulation time of said path to record a count each time the number of signals circulating in said path changes in a predetermined sense, means for applying to said counter signals from said input and output terminals of said delay device, means for applying said quantized signals firstly to clipper means by which the duration of said quantized signals is initially reduced by a second predetermined amount to yield clipped signals and secondly to said control terminal of said gate means and means for applying said clipped signals to said injector means, whereby said counter means registers a count when and only when said scanning element encounters an object having a dimension in the direction of line scanning greater than that corresponding to the distance traversed by said scanning element in the time of said second predetermined amount.

2. Sizing apparatus in accordance with claim 1 in which the delay introduced in said signal circulating path by said delay device is equal to the effective line repetition period of said scanning pattern less the duration of a predetermined number of picture point periods of said pattern and in which said first predetermined amount by which said signals circulating in said path are terminally extended is equal to the duration of twice said predetermined number of picture points.

3. Sizing apparatus in accordance with claim 1 in which said scanner means comprises a television camera including a pickup tube having a photosensitive member, a target member, means for producing on said target member an electric image corresponding to the illumination of said photosensitive member, means for developing an electron beam within said tube and for causing said beam to scan said electric image on said target member in said predetermined pattern of lines to develop at an output terminal electrical signals corresponding to the scanning of said electric image by said electron beam and optical means for imaging said field upon said photosensitive member.

4. Sizing apparatus in accordance with claim 1 in which said scanner means comprises a cathode ray tube having a luminescent screen, means for developing an electron beam within said tube and for scanning said beam over said screen in said predetermined pattern of scanning lines, optical means for imaging said screen upon a field having predetermined optical properties and containing dispersed objects having optical properties differing from those of said field, and electrically light-sensitive means exposed to light in said image after modification by said field to yield electrical signals corresponding with the scanning of said field by light from said screen.

5. Sizing apparatus in accordance with claim 1 in which there is provided means for varying said second predetermined amount by which the duration of said quantized signals is initially shortened by said clipper means whereby the number of objects exceeding differing dimensions may be determined.

6. Sizing apparatus for enumerating those objects among a plurality of objects dispersed over a field which exceed a predetermined dimension, said apparatus comprising: scanner means for developing a scanning element and for effectively traversing said element over said field in a predetermined pattern of scanning lines to develop initial electrical signals varying as said scanning element does or does not encounter any said object, means fed with said initial signals for developing quantized signals having a first value when said scanning element encounters any said object and a second value at all other times, a signal circulating path including in the order recited, injector means for introducing signals into said path, gate means for preventing the passage of signals circulating in said path save when a control signal is applied to a control terminal of said gate means, means for terminally extending the duration of signals circulating in said path by a first predetermined amount to yield extended signals, a delay device having input and output terminals and arranged to delay signals applied to said input terminal by an amount such that the mean signal circulation time in said path is equal to the effective line repetition period of said pattern, means for applying said extended signals to said input terminal and means for returning signals from said output terminal to said injector means, counter means arranged when fed with signals differently delayed by an amount substantially equal to the circulation time of said path to record a count each time the number of signals circulating in said path changes in a predetermined sense, means for applying to said counter means signals from said input and output terminals of said delay device, means for applying said quantized signals to clipper means by which the duration of said quantized signals is initially reduced by a second predetermined amount to yield clipped signals, means for applying said quantized signals secondly to a delay device arranged to delay said quantized signals by a third predetermined amount less than said second predetermined amount to yield delayed quantized signals, stretcher means fed with said clipped signals and arranged terminally to extend the duration of applied signals by a fourth predetermined amount less than said third predetermined amount to yield stretched signals, means for applying said delayed quantized signals to said control terminal of said gate means and means for applying said stretched signals to said injector means.

References Cited in the file of this patent
UNITED STATES PATENTS

| | | |
|---|---|---|
| 2,791,697 | Dell | May 7, 1957 |
| 2,803,406 | Nuttall | Aug. 20, 1957 |